United States Patent Office 3,407,158
Patented Oct. 22, 1968

3,407,158
LOW TEMPERATURE VULCANIZATION OF MONOOLEFIN-NONCONJUGATED POLY-OLEFIN ELASTOMERIC INTERPOLYMERS USING HYDROPEROXIDES
Agatino Guglielmino, Luigi Corbelli, and Enzo di Giulio, Ferrara, Italy, assignors to Montecatini Edison S.p.A., Milan, Italy
No Drawing. Continuation-in-part of application Ser. No. 450,522, Apr. 23, 1965. This application Sept. 14, 1966, Ser. No. 579,215
Claims priority, application Italy, Sept. 20, 1965, 20,898/65
26 Claims. (Cl. 260—23.5)

ABSTRACT OF THE DISCLOSURE

Vulcanization of ethylene/alpha-olefin/polyene terpolymer with organic hydroperoxide at a temperature below 60° C.

---

This application is a continuation-in-part of copending application Ser. No. 450,522, filed Apr. 23, 1965, now abandoned.

This invention relates to a process for cold vulcanization, with the aid of organic hydroperoxides, of high molecular weight, unsaturated, amorphous and substantially linear copolymers, consisting of at least two monomers selected from ethylene and higher alpha-olefins and a monomer selected from cyclic or acyclic polyenes containing unconjugated double bonds.

More particularly, it relates to cold hydroperoxidic vulcanization of linear, amorphous and unsaturated terpolymers of ethylene with propylene or butene-1, and linear cyclic or acyclic diolefins containing unconjugated double bonds, and to the vulcanizates obtained thereby.

It is known that in order to cure particular types of elastomeric saturated polymers, particularly reactive agents, such as organic peroxides, possibly in the presence of free-radical acceptors, are required to be present. Polymers of this nature, such as polyolefins, copolymers of ethylene with alpha-olefins, polyvinylalkylethers, silicone and polyurethane rubbers etc., require for their vulcanization the use of temperatures which are higher than 120° C., in order to allow a rapid decomposition of the peroxides into free radicals.

New types of copolymers having a low degree of unsaturation have recently been made available in the art, consisting of ethylene, an alpha-olefin and a third monomer selected from cyclic or acyclic polyenes having unconjugated double bonds, which copolymers are susceptible of being vulcanized with sulfur and conventional accelerants normally used for cross-linking unsaturated rubbers.

These new copolymers can also be hot vulcanized with the aid of organic peroxides by the methods heretofore used for vulcanizing saturated polymers, halogenated butyl rubber and various unsaturated rubbers.

It has now been found that the above mentioned new copolymers having a low degree of unsaturation can be cured with the aid of organic hydroperoxides, provided that the vulcanization is carried out at temperatures below 60° C. and that in the mix is present at least carbon black as reinforcing filler.

Accordingly, the present invention provides a process for cold vulcanizing, that is at temperatures below 60° C., preferably between 5 and 60° C., terpolymers derived from ethylene, a higher alpha-olefin, preferably, propylene or butene-1, and a monomer selected from cyclic or acyclic polyenes having unconjugated double bonds with the aid of organic hydroperoxides as curing agents, and in the presence of carbon black.

The present invention also provides vulcanizable compositions comprising terpolymers of ethylene and a higher alpha-olefin, preferably propylene or butene-1, with a third monomer selected from cyclic and acyclic polyenes having unconjugated double bonds, a curing agent consisting of an organic hydroperoxide and, if desired, additives such as antioxidants, fillers other than carbon black and pigments.

The present invention is even more surprising since the curing, with the aid of hydroperoxides, of saturated polymers and butyl rubber, which, on the basis of their constitution are most similar to the terpolymers under consideration, gives insufficiently vulcanized polymers when carried out at the temperatures normally employed in peroxidic vulcanization (above 120° C.), while at temperatures below 60° C. practically no vulcanization at all takes place.

The above results have been experimentally verified by vulcanization runs carried out on mixes based respectively on 100 parts of ethylene-propylene copolymer (ML (1+4) 100° C.=35) and 100 parts of butyl rubber, each containing 50 parts of HAF carbon black and 5.7 parts of alpha-cumyl-hydroperoxide at a concentration of 70% in cumene, which, when vulcanized in a press at 150° C. for 60 minutes, do not yield useful products (the mechanical characteristics cannot be determined), while at room temperature no vulcanization occurs, even after 60 days.

It is believed that the vulcanization rate of the terpolymers under consideration at a temperature in proximity to room temperature, using organic hydroperoxides, depends on the reactivity of the residual double bonds introduced, that is on the type of unconjugated double bond diolefinic comonomer used in the terpolymerization.

In accordance with a preferred embodiment of the invention, it has further been found that a cobalt or manganese salt of an aliphatic or cycloaliphatic long-chained carboxylic acid, which salt is oil soluble, helps in raising the vulcanization rate at low temperature to an appreciable extent, when it is introduced into the mixes of a terpolymer of the said type containing an organic hydroperoxide as vulcanizing agent, and, optionally, sulfur and various additives and plasticizers.

In this way, the vulcanization rate of the terpolymers can be increased and the curing time in some cases reduced from 12–20 days to 48–72 hours or less. By the use of suitable accelerators and selected temperatures, in fact, the vulcanization can be carried out also within times ranging from 2 to 48 hours.

The terpolymers of ethylene and higher alpha-olefins, with cyclic or acylic polymers having unconjugated double bonds, preferably comprise copolymers of ethylene, propylene or butene-1, and a third monomer selected from the group consisting of dicyclopentadiene, cyclooctadiene-1,5, cyclooctadiene-1,4, cyclododecadiene-1,6, cyclododecadiene-1,7, cyclododecatriene-1,5,9, cycloheptadiene-1,4, cyclohexadiene-1,4, norbornadiene, methylene-norbornene, 2-methylpentadiene-1,4, hexadiene-1,5, heptadiene-1,6, methyl-tetrahydroindene, hexadiene-1,4, etc.

The hydroperoxides usuable as vulcanizing agents in the present invention have the general formula R—OOH wherein R is a tertiary aliphatic, cycloaliphatic or aromatic radical. Examples of suitable hydroperoxides include alpha-cumyl-hydroperoxide, p - methane - hydroperoxide, tert.-amyl-hydroperoxide, bromo - tert.-butyl - hydroperoxide, m,p-di-isopropylbenzene-monohydroperoxide, m,p-di-isopropylbenzene-dihydroperoxide, etc.

The hydroperoxide curing agent may be introduced into the terpolymer mix in a calender, according to known methods, or can be sprayed in solution on the surface of the manufactured articles, depending on the intended applications for the vulcanizate.

The amount of hydroperoxide necessary to obtain vulcanizates having good mechanical characteristics varies considerably depending on the type of hydroperoxide used. In general, amounts of hydroperoxide ranging from about 0.01 to 20 parts by weight per 100 parts of terpolymer can be used.

The salts which can be used as accelerators in accordance with a preferred embodiment of the invention are cobalt or maganese salts of aliphatic or cycloaliphatic acids having 8 to 18 carbon atoms. Examples of such salts include the cobalt and maganese salts of n-octanoic acid, 2-ethyl-hexanoic acid, lauric acid, palmitic acid, stearic acid, linoleic acid and naphthenic acids. The amounts of accelerator used range from about 0.1 to 2 parts by weight per 100 parts of terpolymer.

The vulcanizable mixer, as usual in the art, can contain, in addition to the curing agent, and carbon black, also antioxidants, pigments, etc.

The presence of sulfur as coagent (which constitutes a further difference from peroxidic vulcanization of saturated olefin copolymers) does not seem to impart particular advantages. On the contrary, a degradation on the mechanical characteristics of the vlucanizates was occasionally observed.

The vulcanization temperatures are generally between about 5° and 60° C. for a period of time ranging from 48 hours to 15 days or even for a longer time. As already mentioned, when a vlucanization accelerator is used, shorter times of as little as two hours may suffice.

As can be observed, due to the low temperatures adopted in the hydroperoxidic vulcanization, particularly long curing times are often required, but this is generally not a disadvantage, since the range of this process comprises vulcanization in situ of manufactured articles of large dimensions and other articles which are heated with difficulty, and for which curing times have no particular importance. Further, when shorter curing times are required, the vulcanization accelerators of this invention may be employed.

The present invention finds its use e.g. in vulcanizing in situ sheets for tank lining, in the preparation of plugs to close holes in plastic sheets, as well as in all the usual applications such as manufacture of gaskets, tarpaulins, and in general, articles produced on a small scale.

The terpolymers use in the present invention contain from 20 to 80% by mols of ethylene, from 0.1 to 18% by mols of polyenes, the remainder consisting of the higher alpha-olefin. The higher alpha-olefin is preferably propylene or butene-1. The molecular weight of the terpolymers is higher than 20,000, and usually ranges from 50,000 to 800,000, preferably from 60,000 to 500,000.

The following examples are presented to illustrate the present invention in detail, without limiting its scope.

EXAMPLE 1

In a conventional type inner mixer, three different mixes comprising the following terpolymers were prepared at room temperature:

(1) Type P—Terpolymer consisting of ethylene/propylene (54% by mols)—cyclooctadiene-1,5 (0.32 mol/kg.)—ML (1+4) 100° C.=49.

(2) Type Q—Terpolmer made up of ethylene/propylene (52% by mols)—dicyclopentadiene (0.515 mol/kg.)—ML (1+4) 100° C.=30.

(3) Type R—Terpolymer consisting of ethylene/propylene (49.5 mols %)—dicyclopentadiene (0.34 mol/kg.)—ML (1+4) 100° C.=41.

Thick (0.8–0.9 mm.) laminae were prepared with mixes of the above terpolymers with carbon black and 70% by weight of alpha-cumyl hydroperoxide in cumene.

The vulcanization conditions, the composition of the terpolymer-based mixes and the mechanical characteristics of the vulcanizates in relationship with time are reported in Table 1.

TABLE 1

| Mixes | 1 | 2 | 3 |
|---|---|---|---|
| Type P terpolymer, parts by weight | 100 | | |
| Type Q terpolymer, parts by weight | | 100 | |
| Type R terpolymer, parts by weight | | | 100 |
| HAF carbon black, parts by weight | 50 | 50 | 50 |
| Alpha-cumyl hydroperoxide (70%) in cumene, parts by weight | 5.7 | 5.7 | 5.7 |

| | Vulcanization temperature, °C. | | | | | | | | | | | | | | |
|---|---|---|---|---|---|---|---|---|---|---|---|---|---|---|---|
| | 20 | | | | | | 20 | | | | 20 | | | | |
| | Time, days | | | | | | | | | | | | | | |
| | 5 | 8 | 12 | 17 | 25 | 35 | 2 | 3 | 5 | 17 | 2 | 3 | 5 | 7 | 10 |
| Tensile strength, kg./cm.² | 13 | 37 | 56 | 85 | 98 | 101 | 48 | 86 | 158 | 196 | 42 | 86 | 137 | 130 | 157 |
| Elongation at break, percent | 460 | 480 | 480 | 430 | 430 | 320 | 420 | 410 | 400 | 235 | 410 | 360 | 320 | 270 | 220 |
| Elastic mod. at 200%, kg./cm.² | 9 | 16 | 19 | 34 | 35 | 59 | 18 | 49 | 63 | 160 | 20 | 37 | 67 | 93 | 138 |
| Elastic mod. at 300%, kg./cm.² | 11 | 23 | 31 | 58 | 62 | 96 | 32 | 68 | 112 | | 32 | 69 | 126 | | |
| Residual set at 100%, percent | 52 | 39 | 34 | 29 | 28 | 25 | 28.5 | 16 | 11.5 | 7 | 27 | 205 | 13 | 10.5 | 8.5 |

EXAMPLE 2

Three mixes based on type P terpolymer of Example 1, containing carbon black and alpha-cumyl hydroperoxide (70%) in cumene in varying proportions were prepared at room temperature in a conventional type mixer, and laminae from 1.5 to 1.8 mm. thick were obtained therewith.

In Table 2 are reported the vulcanization conditions, the composition of the terpolymer-based mixes and the influence of varying amounts of alpha-cumyl-hydroperoxide (70%) in cumene on the mechanical characteristics of the vulcanizates in relationship with time.

TABLE 2

| Mixes | 1 | 2 | 3 |
|---|---|---|---|
| Type P terpolymer, parts by weight | 100 | 100 | 100 |
| HAF carbon black, parts by weight | 50 | 50 | 50 |
| Alpha-cumyl hydroperoxide (70%) in cumene, parts by weight | 2.85 | 5.7 | 10 |

| | Vulcanization temperature, °C. | | | | | | | |
|---|---|---|---|---|---|---|---|---|
| | 20 | | | 20 | | | 20 | |
| | Time, days | | | | | | | |
| | 5 | 8 | 15 | 2 | 3 | 5 | 2 | 3 | 5 |
| Tensile strength, kg./cm.² | (¹) | 17 | 71 | 48 | 86 | 158 | 66 | 98 | 108 |
| Elongation at break, percent | (¹) | 190 | 290 | 420 | 410 | 400 | 480 | 430 | 300 |
| Elastic mod. at 200%, kg./cm.² | (¹) | | 43 | 18 | 49 | 63 | 20 | 40 | 81 |
| Elastic mod. at 300%, kg./cm.² | (¹) | | | 32 | 68 | 112 | 38 | 72 | 108 |
| Residual set (at 100%), percent | (¹) | 50 | 18 | 28.5 | 16 | 11.5 | 26 | 18 | 10 |

¹ Nonvulcanized.

EXAMPLE 3

Various mixes based on Q-type terpolymer of Example 1, containing carbon black, alpha-cumyl hydroperoxide and varying amounts of sulfur, were prepared in a mixer at room temperature, with which mixes laminae from 0.8 to 0.9 mm. thick were manufactured.

Table 3 shows the composition of the mixes, the curing conditions and the mechanical characteristics of sulfur-containing vulcanizates as compared with the ones obtained from a sulfur-free mix.

TABLE 3

| Mixes | 1 | | 2 | | 3 | |
|---|---|---|---|---|---|---|
| Type Q terpolymer, parts by weight | 100 | | 100 | | 100 | |
| HAF carbon black, parts by weight | 50 | | 50 | | 50 | |
| Sulphur, parts by weight | | | 0.42 | | 0.84 | |
| Alpha-cumyl hydroperoxide (70%) in cumene, parts by weight | 5.7 | | 5.7 | | 5.7 | |
| Vulcanization Temperature, °C. | 20 | | 20 | | 20 | |
| Time, days | 3 | 5 | 3 | 5 | 3 | 5 |
| Tensile strength, kg./cm.² | 86 | 158 | 84 | 152 | 86 | 156 |
| Elongation at break, percent | 410 | 400 | 440 | 430 | 460 | 440 |
| Elastic mod. at 200%, kg./cm.² | 49 | 63 | 40 | 60 | 36 | 55 |
| Elastic mod. at 300%, kg./cm.² | 68 | 112 | 59 | 104 | 49 | 96 |
| Residual set at 100, percent | 16 | 11.5 | 22 | 13 | 26 | 15.5 |

EXAMPLE 4

Three different mixes of each type of terpolymer P, Q, and R of Example 1, each containing alpha-cumyl-hydroperoxide (70%) in cumene, carbon black and varying amounts of sulfur as promoter, were prepared in a conventional mixer. Laminae 1 mm. thick were obtained from these mixes. After vulcanization in an oven at 50° C. for 24 hours in a nitrogen stream, these laminae gave specimens for the determination of the mechanical characteristics.

Table 4 shows the mix compositions, the vulcanizing conditions and the mechanical characteristics of the vulcanizates in relationship with the varying amounts of sulfur, as compared with the vulcanizates of a mix which is free of sulfur.

TABLE 4

| Mixes | 1 | | | 2 | | | 3 | | |
|---|---|---|---|---|---|---|---|---|---|
| Type P terpolymer, parts by weight | 100 | 100 | 100 | | | | | | |
| Type Q terpolymer, parts by weight | | | | 100 | 100 | 100 | | | |
| Type R terpolymer, parts by weight | | | | | | | 100 | 100 | 100 |
| HAF carbon-black, parts by weight | 50 | 50 | 50 | 50 | 50 | 50 | 50 | 50 | 50 |
| Sulphur, parts by weight | | 0.42 | 0.84 | | 0.42 | 0.84 | | 0.42 | 0.84 |
| Alpha-cumyl hydroporoxide, 70% in cumene, parts by weight | 5.7 | 5.7 | 5.7 | 5.7 | 5.7 | 5.7 | 5.7 | 5.7 | 5.7 |
| Vulcanization temperature, °C. | 50 | | | 50 | | | 50 | | |
| Time, hours | 24 | | | 24 | | | 24 | | |
| Tensile strength, kg./cm.² | 43 | 22 | 18 | 121 | 66 | 50 | 98 | 91 | 67 |
| Elongation at break, percent | 430 | 450 | 400 | 250 | 305 | 315 | 315 | 380 | 400 |
| Elastic mod. at 200%, kg./cm.² | 21 | 14 | 14 | 96 | 42 | 35 | 48 | 36 | 29 |
| Elastic mod. at 300%, kg./cm.² | 33 | 17 | 17 | | 61 | 48 | 92 | 69 | 52 |
| Residual set at 100%, percent | 40 | 45 | 41 | 14 | 24.5 | 44.5 | 10 | 15 | 26 |

EXAMPLE 5

In a common type mixer, three mixes based on terpolymers of type P and Q of Example 1, comprising alpha-cumyl-hydroperoxide, carbon black and varying amounts of sulfur, were prepared and laminae 1 mm. thick were obtained therefrom.

Then after vulcanization in an oven for 16 hours at 70° C. in a nitrogen stream, specimens of the laminae were taken for the determination of the mechanical characteristics.

The composition of the mixes, the vulcanization conditions and the mechanical characteristics of the vulcanizates in relation to the varying amounts of sulfur are shown in Table 5.

These characteristics show that vulcanization temperature above about 60° C. do not give satisfactory results. This example is therefore shown only for comparison.

TABLE 5

| Mixes | 1 | | | 2 | | |
|---|---|---|---|---|---|---|
| Type P terpolymer, parts by weight | 100 | 100 | 100 | | | |
| Type Q terpolymer, parts by weight | | | | 100 | 100 | 100 |
| HAF carbon black, parts by weight | 50 | 50 | 50 | 50 | 50 | 50 |
| Sulphur, parts by weight | | 0.42 | 0.84 | | 0.42 | 0.84 |
| Alpha-cumyl-hydroperoxide, 70% in cumene, parts by weight | 5.7 | 5.7 | 5.7 | 5.7 | 5.7 | 5.7 |
| Vulcanization temperature, °C. | 70 | | | 70 | | |
| Time, hours | 16 | | | 16 | | |
| Tensile strength, kg./cm.² | 27 | 31 | 22 | 38 | 20 | 14 |
| Elongation at break, percent | 450 | 335 | 385 | 235 | 150 | 120 |
| Elastic mod. at 200%, kg./cm.² | 13 | 22 | 17 | 33 | | |
| Elastic mod. at 300%, kg./cm.² | 22 | 29 | 20 | | | |
| Residual set at 100%, percent | 45 | 50 | 46.5 | 32 | 48 | 58 |

EXAMPLE 6

In a conventional type mixer, mixes based on terpolymers of type P and Q of Example 1 were prepared, comprising alpha-cumyl hydroperoxide (70% in cumene), carbon black and varying amounts of sulfur, with which mixes laminae 1.25–1.50 mm. thick were manufactured and then vulcanized for 60 minutes at 150° C.

Table 6 reports the compositions of the mixes, the curing conditions and the mechanical characteristics of the vulcanizates in relation to the varying amounts of sulfur as compared with the vulcanizates of sulfur-free mixes.

The values of the characteristics, shown here for comparison only, show that the temperature normally used for the curing with peroxides of the saturated ethylene-propylene copolymer, do not bring about useful results here.

TABLE 6

| Mixes | 1 | | | 2 | | |
|---|---|---|---|---|---|---|
| Type P terpolymer, parts by weight | 100 | 100 | 100 | | | |
| Type Q terpolymer, parts by weight | | | | 100 | 100 | 100 |
| HAF carbon-black, parts by weight | 50 | 50 | 50 | 50 | 50 | 50 |
| Sulphur, parts by weight | | 0.42 | 0.84 | | 0.42 | 0.84 |
| Alpha-cumyl hydroperoxide, 70% in cumene, parts by weight | 5.7 | 5.7 | 5.7 | 5.7 | 5.7 | 5.7 |
| Vulcanization temperature, °C. | 150 | | | 150 | | |
| Time, minutes | 60 | | | 60 | | |
| Tensile strength, kg./cm.² | 8 | 10 | 10 | 10 | 9 | 9 |
| Elongation at break, percent | 110 | 200 | 200 | 90 | 90 | 80 |
| Elastic mod. at 200%, kg./cm.² | | 10 | 10 | | | |
| Elastic mod. at 300%, kg./cm.² | | | | | | |
| Residual set at 100%, percent | (¹) | (¹) | (¹) | (¹) | (¹) | (¹) |

¹ Broken.

EXAMPLE 7

A mix based on type Q terpolymer of Example 1 containing carbon black and 100% p-menthane hydroperoxide was prepared in a conventional type mixer. Laminae 1 mm. thick were manufactured from the mix and exposed to air at room temperature to supply specimens for the evaluation of the mechanical characteristics of the vulcanizates.

Table 7 shows the composition of the mixes, the vulcanization conditions and the mechanical characteristics of the vulcanizates in relation to time.

TABLE 7

| Mixes | 1 |
|---|---|
| Type Q terpolymer, parts by weight | 100 |
| HAF carbon black, parts by weight | 50 |
| p-Menthane-hydroperoxide (100%), parts by weight | 4.5 |

| | Vulcanization temperature, 20° C. | | | |
|---|---|---|---|---|
| | Time, days | | | |
| | 11 | 15 | 18 | 20 |
| Tensile strength, kg./cm.² | 95 | 155 | 177 | 188 |
| Elongation at break, percent | 570 | 540 | 405 | 405 |
| Elastic mod. at 300%, kg./cm.² | 51 | 84 | 106 | 131 |
| Residual set at 100%, percent | 26 | 20 | 16 | 14.5 |

EXAMPLE 8

In a conventional inner mixer, two different mixes comprising the following terpolymers were prepared at room temperature:

(1) M Type—Terpolymers consisting of ethylene/propylene (40% by mols)/methyl-tetrahydroindene (0.395 mols/kg.) having a ML (1+4) at 100° C.=64.

(2) N Type—Terpolymer consisting of ethylene/propylene (31% by mols)/methylene-norbornene (0.292 mols/kg.) having a ML (1+4) at 100° C.=91.

TABLE 8

| Mixes | 1 | 2 |
|---|---|---|
| Type M terpolymer, parts by weight | 100 | |
| Type N terpolymer, parts by weight | | 100 |
| HAF carbon black, parts by weight | 50 | 50 |
| 70% alpha-cumyl-hydro-peroxide in cumene, parts by weight | 5.7 | 5.7 |

| | Vulcanization temperature, ° C. | | | | | | | | | | |
|---|---|---|---|---|---|---|---|---|---|---|---|
| | 20 | | | | | | 20 | | | | |
| | Time, days | | | | | | | | | | |
| | 2 | 4 | 6 | 13 | 20 | 25 | 2 | 4 | 7 | 10 | 20 | 25 |
| Tensile strength, kg./cm.² | 75 | 175 | 197 | 221 | 225 | 215 | 16 | 49 | 48 | 56 | 59 | 49 |
| Elongation at break, percent | 570 | 500 | 420 | 385 | 320 | 275 | 180 | 290 | 280 | 260 | 200 | 210 |
| Elastic modulus at 200%, kg./cm.² | 25 | 51 | 77 | 100 | 131 | 147 | | 41 | 41 | 46 | 59 | 47 |
| Elastic modulus at 300%, kg./cm.² | 39 | 98 | 137 | 177 | 219 | | | | | | | |
| Residual set (100%), percent | 48 | 24 | 14 | 10.5 | 10.5 | 7 | (¹) | 34 | 26 | 24 | 19 | 18 |

¹ Broken.

These mixes also contained carbon black and 70% alpha-cumyl hydroperoxide in cumene and were used to prepare 0.4 to 0.6 mm. thick sheets.

The vulcanization conditions, the composition of the terpolymer-based mixes and the mechanical characteristics of the vulcanizates are shown in Table 8 as a function of time.

EXAMPLE 9

In a conventional inner mixer three different mixes based on the following terpolymers were prepared at room temperature:

(1) Q Type—Terpolymer ethylene/propylene (52% by mols)/dicyclopentadiene (0.515 mol/kg.) having a ML (1+4) at 100° C.=30.

(2) M Type—Terpolymer ethylene/propylene (40% by mols)/methyl-tetrahydroindene (0.395 mol/kg.) having a ML (1+4) at 100° C.=64.

From these mixes, containing also carbon black and di-isopropylbenzene-dihydroperoxide, 0.5 to 0.7 mm. thick sheets were prepared.

The vulcanization conditions, the composition of the terpolymer-based mixes and the mechanical characteristics of the vulcanizates are shown in Table 9 as a function of time.

TABLE 9

| Composition of the Mix | 1 | 2 | 3 |
|---|---|---|---|
| Type Q terpolymer, parts by weight | 100 | | |
| Type M terpolymer, parts by weight | | 100 | 100 |
| HAF carbon black, parts by weight | 50 | 50 | 50 |
| m-p-Diisopropylbenzene mono and dihydroperoxide in m-p-diisopropylbenzene (56% expressed as mono-hydroperoxide), parts by weight | 9.1 | 9.1 | |
| p-Diisopropylbenzene-dihydroperoxide, parts by weight | | | 5.95 |

| | Vulcanization temperature °c. | | | | | | | | | | | | | | | |
|---|---|---|---|---|---|---|---|---|---|---|---|---|---|---|---|---|
| | 20 | | | | | | 20 | | | | | | 20 | | | |
| | Time, days | | | | | | | | | | | | | | | |
| | 4 | 5 | 6 | 8 | 9 | 11 | 4 | 5 | 6 | 8 | 9 | 11 | 4 | 5 | 6 | 8 | 9 | 11 |
| Tensile strength, kg./cm.² | 88 | 125 | 169 | 164 | 179 | 166 | 32 | 50 | 61 | 85 | 96 | 105 | 86 | 94 | 105 | 107 | 122 | 114 |
| Elongation at break, percent | 360 | 360 | 360 | 340 | 350 | 290 | 385 | 390 | 365 | 360 | 400 | 395 | 350 | 325 | 310 | 245 | 250 | 210 |
| Elastic modulus at 200%, kg./cm.² | 44 | 58 | 84 | 88 | 91 | 108 | 20 | 27 | 30 | 44 | 44 | 50 | 40 | 46 | 59 | 83 | 95 | 112 |
| Elastic modulus at 300%, kg./cm.² | 75 | 103 | 137 | 146 | 150 | | 27 | 41 | 52 | 74 | 74 | 81 | 71 | 86 | 102 | | | |
| Residual set at 100%, percent | 24 | 16 | 15.5 | 12 | 11 | 9 | 34 | 26 | 25 | 20 | 20 | 16.5 | 21 | 18.5 | 17.5 | 13.5 | 11 | 10 |

EXAMPLE 10

In a conventional inner mixer at room temperature there were prepared four different mixes based on the terpolymers Q and M of Example 8. These mixes also contained carbon black and diisopropylbenzene-dihydroperoxide and from these mixes 0.5 to 0.7 mm. thick sheets were prepared. The sheets were then vulcanized in an oven at 50° C. for 24 hours under a nitrogen current, and specimens were prepared therefrom for the determination of the mechanical characteristics.

In Table 10 are shown the compositions of the mixes, the vulcanization conditions and the mechanical characteristics of the vulcanizates.

EXAMPLE 11

Three mixes of the following composition were prepared in a conventional mixer at room temperature:

| | Ethylene/propylene (39% by mols)/cyclooctadiene, parts by weight | | |
|---|---|---|---|
| | 1 | 2 | 3 |
| (0.277 mols/kg.) terpolymer ML (1+4) 100° C.=84 | 100 | 100 | 100 |
| HAF carbon black | 50 | 50 | 50 |
| Alpha-cumyl-hydroperoxide (70% in cumene) | 5.7 | 5.7 | 5.7 |
| Co 2-ethylhexanoate (accelerator) | 0.5 | 1.0 | |
| Co naphthenate (accelerator) | | | 0.5 |

From these mixes, 0.4–0.6 mm. thick specimens were prepared and kept at room temperature (25° C.) for the times indicated in Table 11. Their mechanical characteristics were observed periodically as a function of time. The results are reported in Table 11.

TABLE 11

| | Mix Number | | | | | | | | | | | |
|---|---|---|---|---|---|---|---|---|---|---|---|---|
| | 1 | | | | 2 | | | | 3 | | | |
| | Accelerator type amount (pp. by wt.) | | | | | | | | | | | |
| | Co 2-ethylhexanoate 0.5 | | | | Co 2-ethylhexanoate 1 | | | | Co-naphthenate 0.5 | | | |
| | Tensile strength, kg./cm.² | Elong. at break, percent | Elast. Mod. at 200%, kg./cm.² | Set at at 100%, percent | Tensile strength, kg./cm.² | Elong. at break, percent | $E_{200}$, kg./cm.² | Set, percent | Tensile strength, kg./cm.² | Elong. at break, percent | $E_{200}$, kg./cm.² | Set, percent |
| Time (days): | | | | | | | | | | | | |
| 2 | 131 | 330 | 63 | 14 | 172 | 335 | 88 | 12 | 128 | 415 | 45 | 20 |
| 3 | 140 | 300 | 87 | 14 | 147 | 250 | 108 | 12 | Not determined | | | |
| 4 | Not determined | | | | Not determined | | | | 172 | 350 | 75 | 14 |
| 5 | 145 | 245 | 109 | 14 | 137 | 210 | 127 | 12 | Not determined | | | |
| 6 | 130 | 230 | 114 | 12 | 141 | 220 | 134 | 12.5 | 169 | 275 | 107 | 11 |
| 8 | Not determined | | | | Not determined | | | | 152 | 245 | 111 | 10.5 |
| 11 | 143 | 200 | 143 | 10 | 115 | 205 | 112 | 12.5 | 130 | 215 | 216 | 10.5 |
| 16 | 128 | 200 | 128 | Broken | 99 | 180 | | Broken | 95 | 170 | | Broken |

TABLE 10

| Composition of the Mix | 1 | 2 | 3 | 4 |
|---|---|---|---|---|
| Type Q terpolymer, parts by weight | 100 | | | |
| Type M terpolymer, parts by weight | | 100 | 100 | 100 |
| HAF carbon black, parts by weight | 50 | 50 | 50 | 50 |
| m-p-Diisobenzene mono and dihydroperoxide in m-p-diisopropylbenzene (56% expressed as mono-hydroperoxide), parts by weight | 9.1 | 9.1 | | |
| p-Diisopropylbenzene-dihydroperoxide, parts by weight | | | 5.95 | 2.97 |

| Vulcanization temperature (in oven under a nitrogen current), °C. | | | |
|---|---|---|---|
| 50 | 50 | 50 | 50 |
| Time, hours | | | |
| 24 | 24 | 24 | 24 |

| | | | | |
|---|---|---|---|---|
| Tensile strength, kg./cm.² | 174 | 64 | 80 | 43 |
| Elongation at break, percent | 305 | 280 | 260 | 300 |
| Elastic modulus at 200%, kg./cm.² | 98 | 44 | 58 | 27 |
| Elastic modulus at 300%, kg./cm.² | 167 | | | 43 |
| Residual set at 100%, percent | 12 | 26 | 15.5 | 36 |

EXAMPLE 12

Mixes having the following composition were prepared in a conventional mixer:

Parts by weight
Ethylene/propylene (35% by mols)/5 - methyltetrahydroindene (0.246 mols/kg.) terpolymer ML (1+4) 100° C.=84 _____ 100
HAF carbon black _____ 50
Alpha-cumyl-hydroperoxide (70% in cumene) _____ 5.7
Accelerators (various types) _____ Variable From these mixes 0.4–0.6 mm. thick specimens were prepared and maintained at room temperature for the times indicated. Table 12 shows the values of the mechanical characteristics as a function of time, compared with the values obtained from mixes which do not contain a vulcanization accelerator.

TABLE 12

| Time (days) | Accelerator type amount (pp. percent by wt.) | | | | | | | | | | | | | | | |
|---|---|---|---|---|---|---|---|---|---|---|---|---|---|---|---|---|
| Mix Number | 1 | | | | 2 | | | | 3 | | | | 4 | | | |
| | | | | | Co naphthenate 0.5 | | | | Co laurate 0.5 | | | | Mn stearate 0.75 | | | |
| | T.S., kg./cm.² | E.B., percent | E₂₀₀, kg./cm.² | Set, percent | T.S., kg./cm.² | E.B., percent | E₂₀₀, kg./cm.² | Set, percent | T.S., kg./cm.² | E.B., percent | E₂₀₀, kg./cm.² | Set, percent | T.S., kg./cm.² | E.B., percent | E₂₀₀, kg./cm.² | Set, percent |
| 0.75 | | Unvulcanized | | | | Unvulcanized | | | | | | | | | | | |
| 1 | | Unvulcanized | | | 211 | 330 | 99 | 11.5 | | 250 | 147 | 10.5 | 80 | 510 | 24 | 36 |
| 1.75 | | Unvulcanized | | | | Not determined | Not determined | | 206 | 190 | Not determined | 8.5 | 119 | 460 | 37 | 25 |
| 2 | 144 | 500 | 38 | 18 | 216 | 210 | 202 | 6 | 178 | Not determined | Not determined | | 200 | Not determined 360 | 87 | 13 |

EXAMPLE 13

Mixes of the following composition were prepared with the same apparatus and under the same conditions as in Example 12:

Parts by weight

Ethylene/propylene (35% by mols)/1,4-hexadiene (0.425 mol/kg.) terpolymer _____ 100
HAF carbon black _____ 50
(70% cumene) alpha-cumyl hydroperoxide _____ 5.7
Accelerators (various types) _____ Variable.

From these mixes, 0.4–0.6 mm. thick specimens were prepared and maintained at room temperature (25° C.) for the given times. The mechanical characteristics as a function of time, of the obtained vulcanizates, are reported in Table 13, where they are compared with those of mixes which do not contain accelerators.

Without the accelerator, no vulcanization took place at the above times and temperatures.

EXAMPLE 14

In a conventional mixer, at room temperature, a mix was prepared which had the same composition as in Example 12, has as the accelerator 0.5 part by weight of Co laurate.

From this mix 0.4–0.6 mm. thick specimens, were prepared for use in the determination of the mechanical characteristics of the vulcanizates. Table 14 gives the mechanical characteristics measured as a function of vulcanization time and temperature.

TABLE 14

| Mix number | 3 of Table 12 | 3 of Table 12 |
|---|---|---|
| Temperature, °C | 60 | 25 |
| Time (hours) | 2 | 4 |
| Tensile strength (kg./cm.²) | 198 | 123 |
| Elongation at break (percent) | 320 | 310 |
| Elastic modulus at 200% (kg./cm.²) | 89 | 52 |
| Elastic modulus at 300% (kg./cm.²) | 180 | 112 |
| Deformation set at 100% (percent) | 10 | 16 |

EXAMPLE 15

In a conventional mixer, at room temperature, a mix was prepared which had the same composition as in Example 12 mix No. 3, except that instead of 50 parts by weight of HAF carbon black were used 70 parts by weight of MT carbon black.

From this mix 0.4–0.6 mm. thick specimens were prepared for use in the determination of the mechanical characteristics of the vulcanizates. Table 15 gives the mechanical characteristics measured as a function of vulcanization time and temperature.

TABLE 13

| | Accelerator type amount (pp. percent by weight) | | | | | | | | | | | | | | | |
|---|---|---|---|---|---|---|---|---|---|---|---|---|---|---|---|---|
| Mix Number | 1 | | | | 2 | | | | 3 | | | | 4 | | | |
| | | | | | Co-2-ethylhexanoate 0.5 | | | | Co-2-ethylhexanoate 1 | | | | Mn octoate 0.5 | | | |
| | T.S., kg./cm.² | E.B., percent | E₂₀₀, kg./cm.² | Set, percent | T.S., kg./cm.² | E.B., percent | E₂₀₀, kg./cm.² | Set, percent | T.S., kg./cm.² | E.B., percent | E₂₀₀, kg./cm.² | Set, percent | T.S., kg./cm.² | E.B., percent | E₂₀₀, kg./cm.² | Set, percent |
| Time (days): | | | | | | | | | | | | | | | | |
| 3 | | Unvulcanized | | | 23 | 580 | 12 | 34 | 39 | 540 | 11 | 34 | | Not determined | | |
| 4 | | Unvulcanized | | | | Not determined | 18 | | | Not determined | 23 | | 48 | 550 | 16 | 26 |
| 5 | | Unvulcanized | | | 71 | 560 | | 20 | 83 | 470 | 33 | 20 | 76 | 550 | 20 | 19 |
| 6 | | Unvulcanized | | | 84 | 510 | 24 | 23 | 82 | 370 | 33 | 21 | | Not determined | | |
| 8 | | Unvulcanized | | | | Not determined | | | | Not determined | | | 96 | 480 | 26 | 19 |
| 11 | 18 | 440 | 14 | 42 | 109 | 430 | 28 | 20 | 110 | 320 | 55 | 20.5 | 118 | 410 | 34 | 18 |
| 16 | | Not determined | | | 125 | 360 | 53 | 16 | 106 | 310 | 63 | 14.5 | | Not determined | | |

TABLE 15

| Mix number | 1 | 2 |
|---|---|---|
| Temperature, °C | 60 | 25 |
| Time (hours) | 2 | 4 |
| Tensile strength (kg./cm.$^2$) | 176 | 118 |
| Elongation at break (percent) | 310 | 305 |
| Elastic modulus at 200% (kg./cm.$^2$) | 80 | 52 |
| Elastic modulus at 300% (kg./cm.$^2$) | 172 | 116 |
| Deformation set at 100% (percent) | 10 | 15 |

Without the accelerator, no vulcanization took place at the above times and temperatures.

While the present invention has been described with respect to specific examples, it is to be understood that these examples are for purposes of illustration, and that the invention is not limited thereto, since many variations and modifications can be practiced without departing from its spirit and scope.

Having thus described our invention, what we desire to secure by Letters Patent and hereby claim is:

1. A vulcanizable composition comprising an amorphous olefin terpolymer having a low degree of unsaturation, said terpolymer consisting of (1) ethylene, (2) a member selected from the group consisting of propylene and butene-1, and (3) a member selected from the group consisting of cyclic and acyclic polyenes containing unconjugated double bonds, carbon black as a reinforcing filler, and, as curing agent, an organic hydroperoxide of the general formula R—OOH wherein R is selected from the group consisting of tertiary aliphatic, cycloaliphatic and aromatic radicals.

2. The composition of claim 1 wherein the organic hydroperoxide is present in amounts ranging from 0.01 to 20 parts by weight per 100 parts of terpolymer.

3. The composition of claim 1 wherein said polyene having unconjugated double bonds is selected from the group consisting of dicyclopentadiene, cyclooctadiene-1,5, cyclooctadiene - 1,4, cyclododecadiene - 1,6, cyclododecadiene - 1,7, cyclododecatriene - 1,5,9, cycloheptadiene - 1,4, cyclohexadiene - 1,4, norbornadiene, methylenenorbornene, 2 - methyl-pentadiene - 1,4, hexadiene-1,5, heptadiene - 1,6, 5 - methyl-tetrahydroindene, and hexadiene-1,4.

4. The composition of claim 2 wherein said polyene having unconjugated double bonds is selected from the group consisting of dicyclopentadiene, cyclooctadiene-1,5, cyclooctadiene - 1,4, cyclododecadiene - 1,6, cyclododecadiene - 1,7, cyclododecatriene - 1,5,9, cycloheptadiene - 1,4, cyclohexadiene - 1,4, norbornadiene, methylenenorbornene, 2 - methyl-pentadiene - 1,4, hexadiene - 1,5, heptadiene - 1,6, 5 - methyl-tetrahydroindene, and hexadiene-1,4.

5. The composition of claim 1 wherein the organic hydroperoxide is selected from the group consisting of alpha-cumyl hydroperoxide, p-menthane-hydroperoxide, tert.amyl - hydroperoxide, bromo - tert.butyl - hydroperoxide, m,p - di - isopropylbenzene - monohydroperoxide, and m,p - di - isopropylbenzene - dihydroperoxide.

6. The composition of claim 4 wherein the organic hydroperoxide is selected from the group consisting of alpha-cumyl hydroperoxide, p-menthane-hydroperoxide, tert.amyl - hydroperoxide, bromo - tert.butyl - hydroperoxide, m,p-di-isopropylbenzene - monohydroperoxide, and m,p - di - isopropylbenzene - dihydroperoxide.

7. The composition of claim 1 wherein the low unsaturation terpolymer contains 20–80% by mols of ethylene and 0.1 to 18% by mols of polyene, the remainder consisting of propylene or butene-1.

8. The composition of claim 6 wherein the low unsaturation terpolymer contains 20–80% by mols of ethylene and 0.1 to 18% by mols of polyene, the remainder consisting of propylene or butene-1.

9. The composition of claim 8 wherein said terpolymer has a molecular weight between about 20,000 and 800,000.

10. The composition of claim 9 wherein said molecular weight is between about 60,000 and 500,000.

11. The composition of claim 1 which further includes from about 0.1 to 2 parts by weight per 100 parts of terpolymer of a vulcanization accelerator selected from the group consisting of the cobalt and manganese salts of aliphatic and cycloaliphatic carboxylic acids containing 8–18 carbon atoms.

12. The composition of claim 10 which further includes from about 0.1 to 2 parts by weight per 100 parts of terpolymer of a vulcanization accelerator selected from the group consisting of the cobalt and manganese salts of aliphatic and cycloaliphatic carboxylic acids containing 8–18 carbon atoms.

13. The composition of claim 11 wherein said aliphatic and cycloaliphatic carboxylic acids are selected from the group consisting of n-octanoic, 2-ethyl-hexanoic, lauric, palmitic, stearic, linoleic acid and naphthenic acids.

14. The composition of claim 12 wherein said aliphatic and cycloaliphatic carboxylic acids are selected from the group consisting of n-octanoic, 2-ethyl-hexanoic, lauric, palmitic, stearic, linoleic acid and naphthenic acids.

15. A process for vulcanizing an amorphous olefin terpolymer having a low degree of unsaturation, said process comprising heating a homogeneous mix consisting of the composition of claim 1 at a temperature below 60° C.

16. A process for vulcanizing an amorphous olefin terpolymer having a low degree of unsaturation, said process comprising heating a homogeneous mix consisting of the composition of claim 10 at a temperature below 60° C.

17. A process for vulcanizing an amorphous olefin terpolymer having a low degree of unsaturation, said process comprising heating a homogeneous mix consisting of the composition of claim 11 at a temperature below 60° C.

18. A process for vulcanizing an amorphous olefin terpolymer having a low degree of unsaturation, said process comprising heating a homogeneous mix consisting of the composition of claim 14 at a temperature below 60° C.

19. The process of claim 15 wherein the heating takes place at a temperature of from 5° to 60° C.

20. The process of claim 17 wherein the heating takes place at a temperature of from 5° to 60° C.

21. The process of claim 18 wherein the heating takes place at a temperature of from 5° to 60° C.

22. The process of claim 16 wherein the vulcanization time is between about 48 hours and 15 days.

23. The process of claim 17 wherein the vulcanization time is between about 2 and 72 hours.

24. The process of claim 21 wherein the vulcanization time is between about 2 and 72 hours.

25. A vulcanizate obtained by the process of claim 15.

26. A vulcanizate obtained by the process of claim 17.

References Cited

UNITED STATES PATENTS

| 3,000,867 | 9/1961 | Fisher | 260—88.2 |
| 3,310,523 | 3/1967 | Lenas | 260—41 |
| 3,325,442 | 6/1967 | McManimie | 260—41 |

OTHER REFERENCES

Haxo, Jr., et al: "A New Sulfur-Curable Ethylene-Propylene Rubber," Rubber Age, November 1963, pp. 255–258.

Noller et al.: "Effect of Accelerators—of Polyesters," Modern Plastics, August 1962, pp. 150, 152 and 154.

DONALD E. CZAJA, Primary Examiner.

R. A. WHITE, Assistant Examiner.

UNITED STATES PATENT OFFICE
CERTIFICATE OF CORRECTION

Patent No. 3,407,158                                        October 22, 1968

Agatino Guglielmino et al.

It is certified that error appears in the above identified patent and that said Letters Patent are hereby corrected as shown below:

In the heading to the printed specification, line 3, "MONOOLEFIN-NONCONJUGATED" should read -- MONOOLEFIN-NON-CON-JUGATED --. Column 1, line 70, "bonds with" should read -- bond: with --. Column 2, line 63, "methane" should read -- menthane --. Column 3, line 8, "maganese" should read -- manganese --; line 10, "maganese" should read -- manganese --. Columns 9 and 10, TABLE 9, about the middle of the table, "Vulcanization temperature ° c." should read -- Vulcanization temperature ° C. --, and to the right of this heading, cancel "P". Column 9, TABLE 10, first column, line 4 thereof, "Diisobenzene" should read -- Diisopropylbenzene --.

Signed and sealed this 3rd day of March 1970.

(SEAL)
Attest:

EDWARD M. FLETCHER, JR.                          WILLIAM E. SCHUYLER, JR.
Attesting Officer                                           Commissioner of Patents